United States Patent Office 3,044,865
Patented July 17, 1962

3,044,865
METHOD OF CONTROLLING PLANT GROWTH BY THE APPLICATION OF 3-HALO-2,3-DIHYDRO-THIOPHENE-1,1-DIOXIDE
Irving Rosen, Painesville, Ohio, assignor to Diamond Alkali Company, Cleveland, Ohio, a corporation of Delaware
No Drawing. Filed Feb. 13, 1959, Ser. No. 792,947
6 Claims. (Cl. 71—2.5)

This invention relates to the novel compounds 3-chloro and 3-fluoro-2,3-dihydrothiophene-1,1-dioxides, their preparation and utilization.

This is a continuation-in-part of applicatoin Serial No. 606,972, Rosen, filed August 30, 1956, now Patent No. 2,928,766.

The novel compounds of this invention have the formula

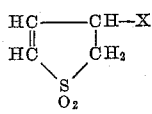

wherein X is chlorine or fluorine.

Thus, it will be understood that the compounds of this invention are as follows:

3-chloro-2,3-dihydrothiophene-1,1-dioxide

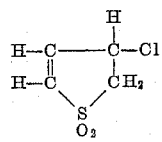

3-fluoro-2,3-dihydrothiophene-1,1-dioxide

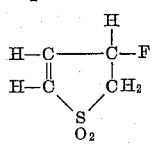

The presently preferred 3-chloro compound can conveniently be prepared by dehydrochlorination of 3,4-dichlorotetrahydrothiophene-1,1-dioxide in an aqueous medium, preferably alkaline, e.g., rendered alkaline by sodium carbonate or calcium carbonate. The reaction may be carried out at varying temperatures although generally heating is desirable, a typically practicable temperature being about 100° C. The 3-fluoro-dihydrotetrahydrothiophene-1,1-dioxide can be prepared by reacting 3-chloro-2,3-dihydrothiophene-1,1-dioxide with hydrogen fluoride.

It has been found that 3-chloro or fluoro-2,3-dihydrothiophene-1,1-dioxides exhibit a high degree of biological activity and are especially useful as active ingredients in various applications where biological activity is required, e.g., in the field of parasiticides, e.g., nematocides, and in the field of plant growth regulants, e.g., herbicides, and the like.

The compounds of this invention exhibit biological activity as will be set forth in some detail hereinafter in the specific examples and may be employed in a variety of formulations, both liquid and solid, including finely-divided powders, granular materials, as well as various liquid solutions, concentrates, emulsifiable concentrates, slurries, and the like, depending upon the application intended and the formulation media employed. It will be appreciated that compounds of this invention form excellent biologically active ingredients which may be employed as an essential ingredient in various compositions which may include such diluents, extenders, fillers, conditioners, solvents, and the like, as various clays, diatomaceous earth, talc, spent catalyst, alumina-silica materials and such liquids as water and various organic liquids such as kerosene, acetone, benzene, toluene, xylene, and other petroleum distillate fractions or mixtures thereof. When liquid formulations are employed, or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol).

In order that those skilled in the art may more completely understand the present invention and the preferred methods by which the same may be carried into effect, the following specific examples are offered:

EXAMPLE I

*Preparation of 3-Chloro-2,3-Dihydrothiophene-1,1-Dioxide*

There is added dropwise 1.06 gm. (0.01 mol) of sodium carbonate in 15 ml. of water to a warm solution (80° C.) of 3.78 gm. (0.02 mol) of 3,4-dichlorotetrahydrothiophene-1,1-dioxide in 50 ml. of water. After the addition is completed, the mixture is heated under reflux for one hour and then cooled. Cooling of the reaction mixture and filtering yields a white crystalline solid melting at 124°-128° C. which is unreacted starting material. The mother liquid is concentrated and cooled to obtain a yellow oil which is extracted with chloroform and reduced in volume to obtain yellow oil which crystallizes on standing. This solid is recrystallized from carbon tetrachloride and colorless needlelike crystals melting at 82° C. are isolated.

Chemical analysis of the product indicates that the desired 3-chloro-2,3-dihydrothiophene-1,1-dioxide $$(C_4H_5ClO_2S)$$

is obtained, the following analytical results being reported in terms of percent by weight.

| Element | Calculated | Found |
|---------|-----------:|------:|
| C       | 31.50      | 31.45 |
| H       | 3.30       | 3.33  |
| Cl      | 23.25      | 24.2  |

The pure compound was distilled and found to boil at 164° C. at 10 mm. Hg.

EXAMPLE II

*Preparation of 3-Fluoro-2,3-Dihydrothiophene-1,1-Dioxide*

Into a reactor comprising a polyethylene bottle are placed 63 gms. (0.49 mol) of silver fluoride and 30.4 gms. (0.2 mol) of 3-chloro-2,3-dihydrothiophene-1,1-dioxide. The bottle, containing a calcium chloride drying tube, is placed in a dish containing Dry Ice and acetone. Hydrogen fluoride from a gas cylinder is condensed in the bottle. About 100 ml. of hydrogen fluoride is collected. The bottle is then placed in an ice bath and left at room temperature for several hours. The hydrogen fluoride is evaporated and the resultant solid extracted with chloroform. This extraction is repeated, the chloroform being evaporated and 19 gms. of crude material recovered, comprising a 70% yield based on the 3,4-dichlorotetrahydrothiophene-1,1-dioxide employed. The brown solid is recrystallized twice from benzene to obtain a product melting at 67-69° C. The product contains no chlorine as shown by sodium fusion. The material is further recrystallized from chloroform to obtain a pure white material melting at 68-69° C. Production of the desired compound ($SFO_2C_4H_5$) is indicated by the following elemental analysis:

| Element | Percent calculated | Percent actual |
| --- | --- | --- |
| C | 35.30 | 35.39 |
| H | 3.68 | 3.82 |
| Cl | 14.00 | 12.40 |

An I.R. reference curve indicates the presence of a -C=C- and an $SO_2$ group.

EXAMPLE III

Experiments are conducted utilizing 3-chloro-2,3-dihydrothiophene-1,1-dioxide by pouring 51 ml. portions of a 2000 parts per million aqueous formulation of this compound prepared using 5% acetone as a solvent and 0.01% Triton X–155 as an emulsifier into 4-inch clay pots on soil in which tomato or bean plants are growing. The thus-treated plants are held in a greenhouse for 10 days and are examined and rated in accordance with a phytotoxicity rating scale ranging from 0=no injury to a value of 11, meaning the plant is killed. Using such a procedure, the tomato plants are killed. The same procedure indicates a phytotoxicity value rating of 10 against bean plants indicating a high degree of herbicidal action.

EXAMPLE IV

Further to illustrate biological activity 3-chloro-2,3-dihydrothiophene-1,1-dioxide is evaluated as a nematocide against the root knot nematode (Meloidogyne sp). In this experiment, one-half gallon glazed crocks of soil infested with 3–5 gm. of knotted tomato roots are treated, at the rate of 128 lbs. per acre, by mixing 3-chloro-2,3-dihydrothiophene-1,1-dioxide with the soil. The results of such tests, using a rating from 0 for no infestation to 5 for severe infestation, indicate that the 3-chloro-2,3-dihydrothiophene-1,1-dioxide produces a 0 rating on the tomato plants while an untreated check sample has a rating of 4.7, indicating an extremely high concentration of nematodes.

EXAMPLE V

A further nematocidal test is made using 3-chloro-2,3-dihydrothiophene-1,1-dioxide against the non-plant parasitic nematode, Panagrellus redivivus, by exposing the nematodes to the chemical in small watch glasses (27 mm. diam. x 8 mm. deep) within a 9 cm. Petri dish for 24 hours. A test formulation comprising test chemical, 5% acetone, 0.01% Triton X–155, and the balance water, is used. The percentage mortality at concentrations of 2000 and 1000 parts per million are 100% and 72%, respectively, thus indicating a high degree of nematocidal effectiveness.

EXAMPLE VI

A further experiment is conducted using 3-chloro-2,3-dihydrothiophene-1,1-dioxide against tomato root knot nematodes in soil at concentration of 64, 32 and 16 lbs. per acre. In this test no phytotoxicity is noted and nematode infection ratings of 0.0, 0.5 and 1.3, respectively, are obtained as compared to an untreated check sample infestation of 4.8.

EXAMPLE VII

A further nematocidal test is conducted by applying 3-chloro-2,3-dihydrothiophene-1,1-dioxide via direct mixing with soil as a nematocide against root-knot nematodes using tomato as the indicator plant at concentrations of 32, 24 and 16 lbs. per acre. The nematode infection ratings resulting are 0.0, 0.0 and 0.2, respectively, as against an untreated check sample nematode rating of infection of 5.0.

EXAMPLE VIII

A herbicidal test is conducted using 3-chloro-2,3-dihydrothiophene-1,1-dioxide as a pre-emergent herbicide applied in amounts of 16, 8 and 4 lbs. per acre. The estimated percentage stands, as compared to checks and other responses on broadleaf and grass at the foregoing concentrations are (broadleaf) 5, 10, 75 and (grass) 30, 100 and 100, respectively. This data indicates a high degree of toxicity with respect to germinating seed in the soil especially against broadleaf plants.

EXAMPLE IX

An alternative preparation of 3-chloro-2,3-dihydrothiophene-1,1-dioxide is as follows:

In a 4-liter beaker containing 2 liters of water at 90° C. there are dissolved 250 gm. (1.32 mol) of 3,4-dichlorotetrahydrothiophene-1,1-dioxide and 92.5 gm. (0.925 mol) of calcium carbonate. The aqueous reaction mixture is allowed to cool and is filtered to yield a solid product which is extracted with 250 ml. of hot benzene. The benzene extract is cooled and filtered. The resultant filtrate, after removal of further solids deposited, is concentrated to a volume of about 100 ml. and cooled.

The cooled filtrate is then extracted with 2–500 ml. portions and 4–250 ml. portions of chloroform. The resultant chloroform solution is then washed with 250 ml. of water. The remainder of the solvent is separated to yield a dark residue which slowly crystallizes. This crystalline product is dissolved in 150 ml. of hot benzene, allowed to cool to room temperature and stand for 4 hours to effect precipitation of a solid and is then filtered. This filtrate is evaporated to a volume of about 75 ml. and is filtered to obtain the desired 3-chloro-2,3-dihydrothiophene-1,1-dioxide.

EXAMPLE X

Using the general procedure of Example III, 3-fluoro-2,3-dihydrothiophene-1,1-dioxide has a phytotoxicity rating of 11, thus indicating plant kill, against tomato and bean plants when applied at 128 lbs. per acre. Further tests both via foliage spray (6400 p.p.m.) and via soil watering (128 lbs. per acre) indicate kill of tomato and bean in both instances. The foliage spray test also kills corn under similar conditions.

EXAMPLE XI

Using the procedure of Example X, 3-fluoro-2,3-dihydrothiophene-1,1-dioxide, at 64 lbs. per acre, a zero growth rating with respect both to broadleaf and grass plants, indicates a high degree of herbicidal activity. A post-emergent foliage spray test against tomato, bean and oats indicates a rating of 11, 11 and 10, respectively, thus demonstrating herbicidal action in post-emergent application also.

EXAMPLE XII

Using the procedure of Example V, 3-fluoro-2,3-dihydrothiophene-1,1-dioxide exhibits a 100% nematode kill in contact action at 1000 p.p.m.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of controlling plant growth which comprises applying to said plant a herbicidally effective amount of a composition of matter containing as an essential active ingredient a 3-halo-2,3-dihydrothiophene-1,1-dioxide.

2. The method of controlling plant growth which comprises applying to seeds of said plant a herbicidally effective amount of a composition of matter containing as an essential active ingredient a 3-halo-2,3-dihydrothiophene-1,1-dioxide.

3. The method of controlling plant growth which comprises applying to the soil around said plant growth a herbicidally effective amount of a composition of matter containing as an essential active ingredient a 3-halo-2,3-dihydrothiophene-1,1-dioxide.

4. The method of controlling plant growth which comprises applying to said plant a herbicidally effective amount of a composition of matter containing as an essential active ingredient a 3-chloro-2,3-dihydrothiophene-1,1-dioxide.

5. The method of controlling plant growth which comprises applying to said plant a herbicidally effective amount of a composition of matter containing as an essential active ingredient a 3-fluoro-2,3-dihydrothiophene-1,1-dioxide.

6. The method of controlling plant growth which comprises applying to the soil around said plant growth a herbicidally effective amount of a composition of matter containing as an essential active ingredient a 3-chloro-2,3-dihydrothiophene-1,1-dioxide.

References Cited in the file of this patent

UNITED STATES PATENTS

| | | |
|---|---|---|
| 2,701,759 | Feldman et al. | Feb. 8, 1955 |
| 2,810,728 | Beesley et al. | Oct. 22, 1957 |
| 2,898,205 | Pyne | Aug. 4, 1959 |
| 2,939,871 | Pyne et al. | June 7, 1960 |

FOREIGN PATENTS

| | | |
|---|---|---|
| 542,599 | Belgium | Nov. 30, 1955 |
| 536,564 | Canada | Jan. 29, 1957 |

OTHER REFERENCES

Bailey et al.: Journal American Chemical Society, vol. 76, pp. 1932–1936 (1953).

Krug et al.: Journal of Organic Chemistry, vol. 23, pp. 212–215 (1958).